United States Patent [19]

Miller et al.

[11] Patent Number: 5,085,070
[45] Date of Patent: Feb. 4, 1992

[54] CAPACITIVE FORCE-BALANCE SYSTEM FOR MEASURING SMALL FORCES AND PRESSURES

[75] Inventors: Gabriel L. Miller, Westfield; Eric R. Wagner, South Plainfield, both of N.J.

[73] Assignee: AT&T Bell Laboratories, Murray Hill, N.J.

[21] Appl. No.: 476,865

[22] Filed: Feb. 7, 1990

[51] Int. Cl.$^5$ .............................................. G01B 5/28
[52] U.S. Cl. ........................................ 73/105; 73/724
[58] Field of Search ............ 73/105, 724, 780, 862.64, 73/862.68; 381/113; 361/280, 283

[56] References Cited

U.S. PATENT DOCUMENTS

| | | | |
|---|---|---|---|
| 3,076,870 | 2/1963 | Jones, Jr. .............................. | 381/113 |
| 4,227,419 | 10/1980 | Park .................................... | 361/283 |
| 4,359,892 | 11/1982 | Schnell et al. ........................ | 73/105 |
| 4,644,798 | 2/1987 | Tamura et al. ....................... | 361/283 |
| 4,665,739 | 5/1987 | Mizuno ................................ | 73/105 |

OTHER PUBLICATIONS

"The Application of Capacitive Transducers to Sound Velocity Measurements in TTF-TCNO", by T. Tiedje et al., *J. Acoust. Soc. Am.*, vol. 65, No. 5, May 1979, pp. 1171-1180.

"The Precise Measurement of Small Capacitances", by A. M. Thompson IRE Transactions on Instrumentation, Dec. 1958, pp. 245-253.

"The Design and Some Applications of Sensitive Capacitance Micrometers", by R. V. Jones et al., Review Article, *Journal of Physics E: Scientific Instruments*, 1973, vol. 6, Printed in Great Britain, pp. 589-600.

*Primary Examiner*—Robert Raevis
*Attorney, Agent, or Firm*—G. D. Green

[57] ABSTRACT

A force balancing method and apparatus detects small changes in force or pressure. An LC tuned circuit having a capacitor with at least one movable plate senses force or pressure changes. Deviations in the phase of the response of the tuned circuit are compared to the phase of a driving reference oscillator to generate an error signal. The error signal is used to control the oscillator to increase or decrease its output amplitude for driving the tuned circuit. As a result the electrostatic force across the capacitor plates tends to change in such a way as to precisely balance the effect of external force or pressure changes. The system therefore operates in a force-balance mode and in such a way as to provide a high sensitivity together with a precisely controlled stiffness. This system is particularly applicable to high sensitivity microphones, micro-topography, and atomic force microscopy.

10 Claims, 1 Drawing Sheet

CAPACITIVE FORCE-BALANCE SYSTEM FOR MEASURING SMALL FORCES AND PRESSURES

TECHNICAL FIELD

The invention relates generally to the field of instrumentation and particularly to the measuring or sensing of small pressure changes, at low frequencies, as in microbarographs and low frequency microphones; and small forces as in micro-topography and atomic force microscopy.

BACKGROUND OF THE INVENTION

From a noise analysis point of view, many pressures sensors involving a capacitive sensing element, such as capacitor microphones, ultimately conform to the equivalent circuit shown in FIG. 1. Here $e_n$ is the series noise spectral density of the amplifier 100, commonly expressed in $nV/\sqrt{Hz}$. This can be transformed into an equivalent "series noise resistance" $R_s$ using the Nyquist formula, $$e_n = \sqrt{4KTR_s},$$

where K is Boltzmann's constant and T is the absolute temperature.

A second noise source is characterized by the shunt or "parallel" noise resistance $R_p$. This corresponds not only to any actual parallel resistances (e.g., gate bias resistors for the amplifier input stage), but also to any system parallel leakage currents. Such currents can arise as FET gate leakage currents or bipolar transistor base currents, etc. The connection between such currents I and their equivalent resistance value R is given by the "fifty millivolt rule", $$R = \frac{2KT}{qI},$$

where q is the charge on the electron. (The value of $2KT/q$ is 50 mV at room temperature).

The important consideration that is clear from FIG. 1 is that the series noise from $R_s$ is dominant at high frequencies, while the parallel noise from $R_p$ dominates increasingly at low frequencies. The crossover between these two situations is characterized by $T_c$ the "noise corner time constant", $$T_c = C_t \sqrt{R_p R_s}.$$

The significance of $T_c$ is that it is the reciprocal of the crossover frequency (in radians per second) at which the series and parallel noise contributions are equal. For applications involving relatively low frequencies, of which an audio microphone is an example, the parallel noise dominates the series noise. At frequencies much greater than the crossover frequency, the series noise dominates the parallel noise.

Pressure sensing devices such as capacitor microphones operate by generating a voltage $\Delta V$ in response to the movement of the capacitive element. This signal voltage $\Delta V$ is then to be compared with the noise voltages generated by $R_p$ and $R_s$ as they enter into the circuit of FIG. 1. This defines the signal to noise ratio (S/N), which in turn controls the sensitivity of the measurement, i.e. the lowest pressure change that can be detected. An alternative approach uses a known resonant phase shift method for measuring the small change in a capacitor value caused by the movement of one of its electrodes. In this method the capacitor of interest (e.g. a capacitor microphone) is used as the tuning capacitor in an LC resonant tuned circuit. Signal information is derived from the phase shift in tuned circuit response that results from any small changes $\Delta C$ in the capacitor value. It can then be shown that for high quality factor (Q) tuned circuits, and large (S/N) ratios, the sensitivity can be extremely high. The advantage of this method is that there is no noise source equivalent to the parallel source $R_p$. Sensors of this general type have been known for many years. However, the method suffers from two closely related problems in attempting to achieve the highest sensitivity. The first of these difficulties is that the AC drive voltage appearing across the capacitor itself produces an electrostatic force between its plates, which can produce mechanical instability. Secondly, particularly as the pressure sensitive plate of the capacitor is made lighter, the capacitance can be subject to large and uncontrolled drifts with temperature and time.

SUMMARY OF THE INVENTION

An improvement in the art is achieved in a force-balance resonant phase shift apparatus for detecting small forces or pressures. The apparatus comprises a tuned circuit having a capacitor with at least one movable plate for sensing force or pressure. The tuned circuit is resonant at a first frequency when there is a zero net force on the movable plate. An oscillator is provided which is tuned to a second frequency different from the first frequency. Means that are responsive to the output of the oscillator generate a first output signal at the second frequency to drive the resonant circuit. This means further includes means for generating a second output signal having a phase that is modulated about a prescribed center phase in response to force or pressure changes sensed by the capacitor. Means are also provided for generating an error signal based on the modulations of phase of the second signal with respect to the phase of the oscillator output for controlling the amplitude of the drive supplied to the tuned circuit. The apparatus operates in a force balanced mode in which the movable capacitor plate automatically adjusts its position to equalize the resonant frequency of the tuned circuit and the oscillator frequency. Thereafter, the error signal detection and feedback mechanism operates to maintain this equalized position of the movable plate by changing the voltage across the capacitor in response to force or pressure changes.

In a preferred embodiment, the prescribed center phase of the second output signal is in quadrature with the phase of the oscillator output. The error signal generating means further includes a multiplier for multiplying the second output signal with the oscillator output and an integrator for integrating the output of the multiplier. Also, in the preferred embodiment, the means for generating the first and second output signals is a transistor connected in an emitter follower configuration for driving the tuned circuit. This allows the tuned circuit to be driven with a low driving point impedance, while the phase deviations of current in the tuned circuit are sensed in the collector of the transistor for input to the error signal generating means.

The apparatus is useful in many force and pressure sensing applications, such as audio microphones, microbarographs, microtopography and atomic force microscopy. Inherent within the apparatus is the force balance servoing effect which prevents the tendency of capacitor plates to collapse together under increased voltage operation. Therefore the invention allows the use of large drive voltages. This in turn improves the signal to noise ratio of the apparatus. The servoing effect also means that the apparatus is always operating at the peak of the tuned circuit resonance, i.e. at the maximum Q point. This further improves the signal to noise operation of the apparatus. Slow drifts in the value of the capacitor or the inductor of the tuned circuit are automatically compensated by the servo effect. Moreover, any slow drift in the operating frequency of the oscillator is also compensated, since this merely results in a small tracking shift in the tuned circuit resonance frequency. All of these factors contribute in allowing the apparatus to operate in the force-balance mode with a high signal to noise ratio.

DETAILED DESCRIPTION

Figure 1:
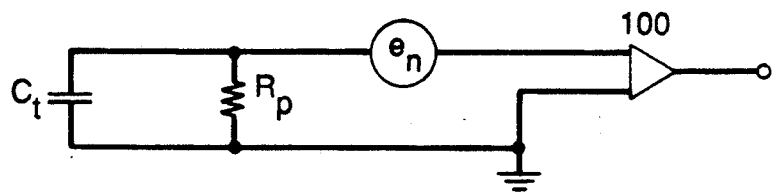
FIG. 1 shows an equivalent circuit of the prior art for detecting changes of pressure by capacitive sensing which is discussed in the Background of the Invention.
Figure 2:
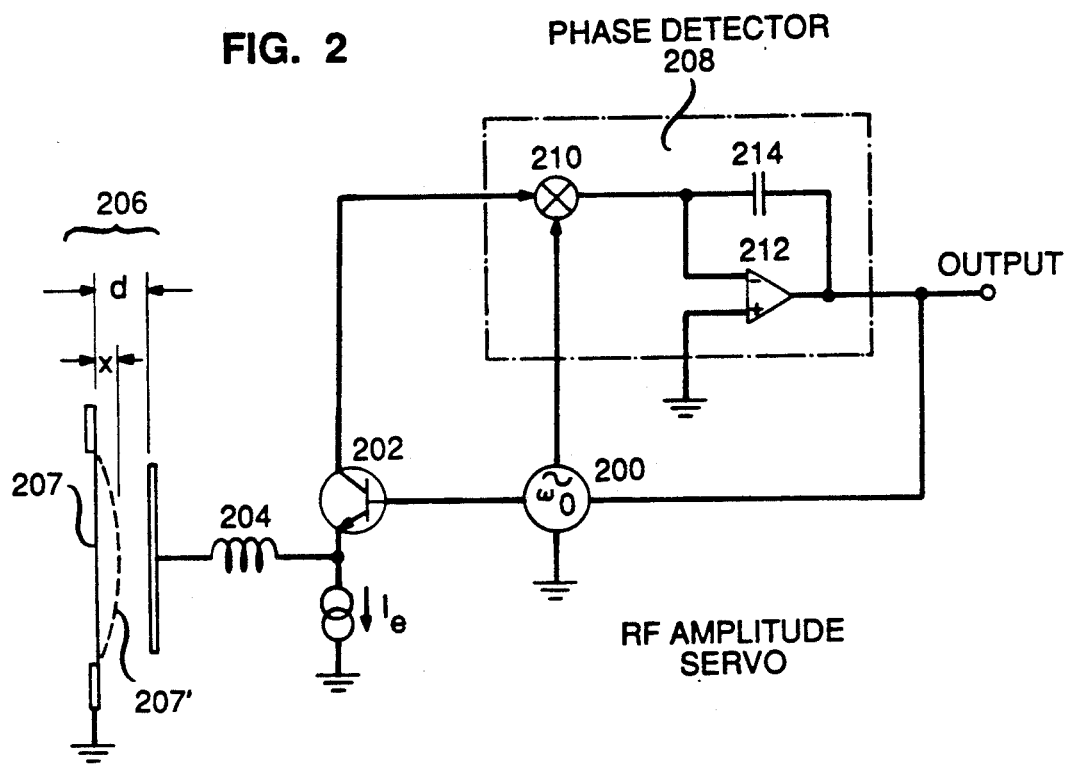
FIG. 2 shows a schematic of the force-balance resonant phase-shift method of the invention applied to a capacitor microphone.

FIG. 2 shows one preferred embodiment of a force balanced capacitive pressure sensor. An oscillator 200 operating at a frequency of $\omega_0$ drives the base of a transistor 202. The transistor is arranged as an emitter follower, with the low impedance emitter driving the series resonant tuned circuit consisting of inductor 204 and capacitor 206. Capacitor 206 further comprises at least one movable plate 207, which is used to sense pressure changes occurring on one side of the plate. The oscillator 200 also provides the reference phase for the phase detector 208. This reference signal is 90° phase shifted with respect to the drive to the emitter follower 202. Phase detector 208 consists of a multiplier 210 which multiplies the oscillator output and the collector 202 signal and an integrator consisting of operational amplifier 212 and integrating capacitor 214.

The value of the oscillating frequency $\omega_0$ of oscillator 200 is selected to be lower than the natural resonant frequency $1/\sqrt{LC}$ of the tuned circuit 204/206. As a result there is a deviation from ninety degrees between the phase of the collector 202 signal, caused by the tuned circuit 204/206, and the reference signal from the oscillator. Consequently multiplier 210 produces an output signal which drives the integrator 212/214. The integrator output in turn is used to control oscillator 200 to cause it to increase the amplitude of the drive to the base of transistor 202. This then produces an increase in the alternating voltage (Q times larger than the base drive to transistor 202) across the sensing capacitor 206. The resulting electrostatic force between the capacitor plates therefore bows the movable plate 207 inward toward the fixed plate, as shown by the dashed line 207'. This increases the value of the sensing capacitance and therefore lowers the resonant frequency of the tuned circuit 204/206. This process continues until the resonant frequency of tuned circuit 204/206 is exactly equal to $\omega_0$. In this process the movable plate 207/207' will have moved some small distance x from its initial spacing d from the fixed plate. The spacing of the capacitor plates is now (d—x) and this distance itself is under servo control, set by the choice of $\omega_0$. The output of the integrator 212/214 also comprises the output of the pressure sensor.

Any small pressure change on one side of the movable plate (e.g. that produced by sound if the application is a microphone) produces a corresponding deflection of the movable plate and, therefore, a change in the alternating voltage V appearing directly across the capacitor. This occurs in such a way that the resulting change in the electrostatic force tends to oppose the effect of the change in pressure. That is, the movable plate 207' tends to return to its spacing (d—x). In the limit of large loop gain, and in a simplified analysis, it can be shown that $$\delta V = A \frac{(d-x)}{CV} \delta P,$$

where A is the area of the capacitor plates and C is the capacitance. Since (d—x) and C are constant, by virtue of the servo action, it follows that $\delta V$ is proportional to $\delta P$ (provided that $\delta V$ itself is small compared to V, which is the case in practice).

A demonstration microphone prototype apparatus has been constructed of precisely the form shown in FIG. 2. The movable plate of the microphone is made from 6 μm, thick metallized plastic foil stretched over a high-rimmed 3.7 cm diameter perforated backplate. The center of the backplate contains a raised circular region 1.5 cm in diameter that is also perforated. The total capacitance is $\approx 200$ pf, and it is series resonated with a 1.7 mh inductor. The resonant frequency is $\approx 200$ KHz, and it operates with $\approx 10$ volts p—p of alternating voltage drive across the capacitor gap. This capacitive sensor is mounted on a matching, closed, 6 cm long aluminum cylinder, that is filled with fiberglass wool as an acoustic damper. A small bleed hole is provided to equalize the internal and external atmospheric pressures. This produces a low frequency acoustic cutoff of below 1 Hz. The frequency response of this prototype is essentially flat from $\approx 1$ Hz to $\approx 1$ KHz. The threshold sensitivity at unity signal to noise ratio is substantially less than 500 μPa and the system operates, as expected, in the force-balance mode.

Figure 3:
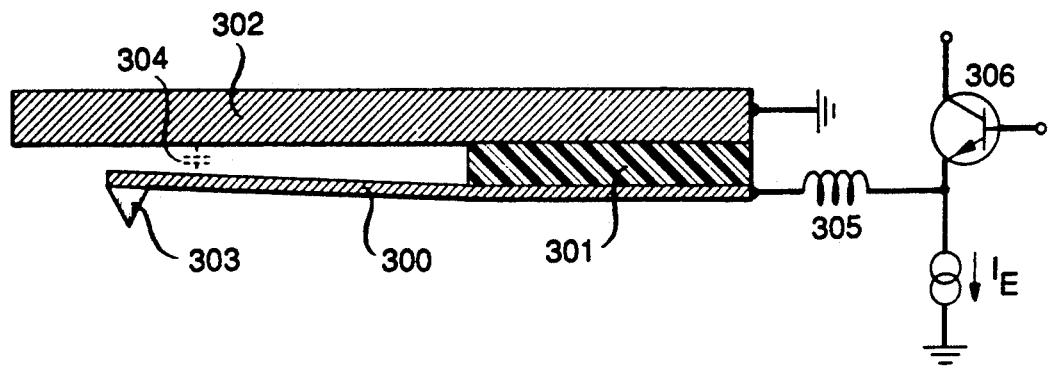
FIG. 3 shows the force-balance resonant phase-shift method applied to microtopography and atomic force microscopy.

The preceding account has been primarily concerned with capacitor microphone types of application. However, this has been done for illustrative purposes only since it will be appreciated that the force-balance method presented is capable of much wider application. A case in point is provided by its use for microtopography and atomic force microscopy, as indicated in FIG. 3. Here a microfabricated flexible beam 300 is mounted on an insulator 301 next to a grounded surface 302. The beam carries an extremely fine microfabricated point 303 that is used to probe the surfaces of interest as in micro-topography and atomic force microscopy. Any small force acting on the tip tends to deflect the beam, thereby changing the capacitance 304 to ground. As before the sensing capacitance 304 is resonated with an inductor 305 and driven by a transistor 306. Also as before the system servoes the RF drive amplitude so that the electrostatic force keeps the beam slightly bowed in towards the grounded surface and in an essentially fixed position. This is achieved by using electronics precisely like those shown in FIG. 2, and as before the output signal is provided from the error integrator that controls the oscillator amplitude.

This system has also been demonstrated experimentally. It has high sensitivity, exhibits performance that is completely calculable from simple measurements, and has the virtue of providing a sensing element that has controlled stiffness by means of the force-balance servo action.

It is to be understood that the above described arrangements are merely illustrative of the application of principles of the invention and that other arrangements may be devised by workers skilled in the art without departing from the spirit and scope of the invention.

We claim:

1. A resonant phase shift apparatus for detecting changes in force or pressure, comprising
    a tuned circuit having a capacitor with at least one movable plate for sensing force or pressure changes,
    an oscillator for driving the tuned circuit and operating at a frequency different from the natural frequency of the tuned circuit, and
    means for comparing deviations in the phase of the response of the tuned circuit to the phase of the oscillator to generate an error signal for controlling the amplitude of the oscillator output driving the tuned circuit.

2. Apparatus for detecting changes in force or pressure, comprising
    a tuned circuit having a capacitor with at least one movable plate for sensing force or pressure changes, said tuned circuit being resonant at a first frequency when there is a zero net force or pressure acting on the movable plate,
    an oscillator tuned to a second frequency which is different from the first frequency.
    means responsive to the output of the oscillator for generating a first output signal at the second frequency for supplying current to the resonant circuit, and including means for generating a second output signal having a phase that is modulated about a prescribed center phase in response to force or pressure changes sensed by the capacitor, and
    means for generating an error signal based on the modulations of phase of the second signal with respect to the phase of the oscillator output for controlling the amplitude of the drive supplied to the tuned circuit.

3. The apparatus of claim 2 wherein the capacitor is the sensing element of a microphone.

4. The apparatus of claim 2 wherein the capacitor is the sensing element of a micro-topograph or an atomic force microscope.

5. The apparatus of claim 2 wherein the prescribed center phase of the second output signal is in quadrature with the oscillator output and error signal generating means further comprises
    means for multiplying the second output signal with the oscillator output, and
    means for integrating the output of the multiplying means.

6. The apparatus of claim 5 wherein the means for generating the first output signal further comprises an active device having a low driving point impedance relative to the impedance of the tuned circuit.

7. The apparatus of claim 6 wherein the active device further comprises at least an input port connected to the oscillator output, an inverting output port for supplying the second signal, and a third port for supplying the first signal.

8. The apparatus of claim 7 wherein the active device is a transistor having a base as the first port, a collector as the second port and an emitter as the third port.

9. Apparatus for detecting changes in force or pressure, comprising
    a tuned circuit having a capacitor with at least one movable plate for sensing force or pressure changes on one of its sides, said tuned circuit being resonant at a first frequency when there is a zero force or pressure difference on the two sides of the movable plate,
    an oscillator tuned to a second frequency which is less than the first frequency,
    means responsive to the output of the oscillator for generating a first output signal at the second frequency for supplying current to the resonant circuit, and including means for generating a second output signal phase modulated about a center phase which is in quadrature with the phase of the oscillator output in response to pressure changes sensed by the capacitor, and
    means for generating an error signal based on the difference in phase between the outputs of the oscillator and the generating means for controlling the amplitude of the drive supplied to the tuned circuit.

10. A force or pressure sensor, which comprises
    a tuned circuit having a capacitor with a movable element adapted for sensing the force or pressure,
    an oscillator driving the tuned circuit and operating at a frequency different from the natural resonant frequency of the tuned circuit,
    means for generating an error signal by comparing the phase of the response from the tuned circuit to the phase of the oscillator output, the error signal being connected to control the amplitude of the oscillator output and to an output terminal of the sensor,
    whereby electrostatic force from voltage appearing across the capacitor deflects the movable element and changes the resonant frequency of the tuned circuit to the frequency of the oscillator and whereby application of the force or pressure to the movable element causes deviations in the error signal related to the magnitude of the force or pressure.

* * * * *